No. 690,589. Patented Jan. 7, 1902.
B. KUETTNER.
PLATE FOR SECONDARY BATTERIES.
(Application filed Aug. 8, 1901.)
(No Model.)

Witnesses
Frank William Pattison
Annie Cecilia Härle

Inventor
Berthold Kuettner
per
A. M. Glass
Attorney

UNITED STATES PATENT OFFICE.

BERTHOLD KUETTNER, OF WOKING, ENGLAND.

PLATE FOR SECONDARY BATTERIES.

SPECIFICATION forming part of Letters Patent No. 690,589, dated January 7, 1902.

Application filed August 8, 1901. Serial No. 71,389. (No model.)

*To all whom it may concern:*

Be it known that I, BERTHOLD KUETTNER, of Accumulator Industries, Ltd., a subject of the Emperor of Germany, residing at Woking, in the county of Surrey, England, have invented an Improved Plate for Secondary Batteries, of which the following is a specification.

This invention relates to a plate of the Planté type for use in secondary batteries, and provides a plate which presents a very large surface to the action of the electrolyte and has internal circulation and is at the same time of great strength and of good conductivity.

Figure 1:
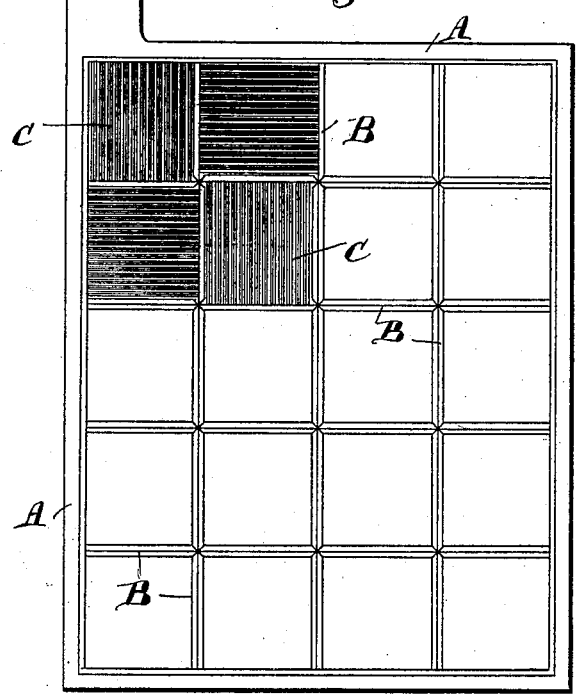
Figure 2:
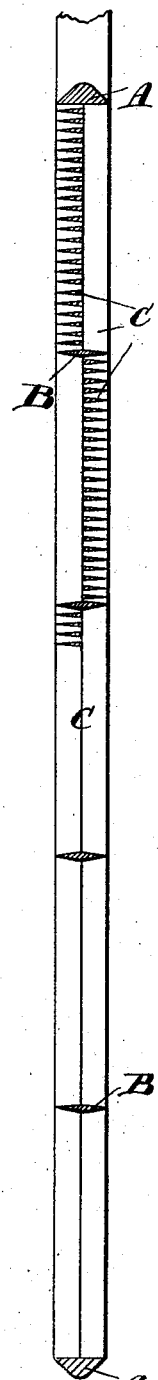
Figure 3:
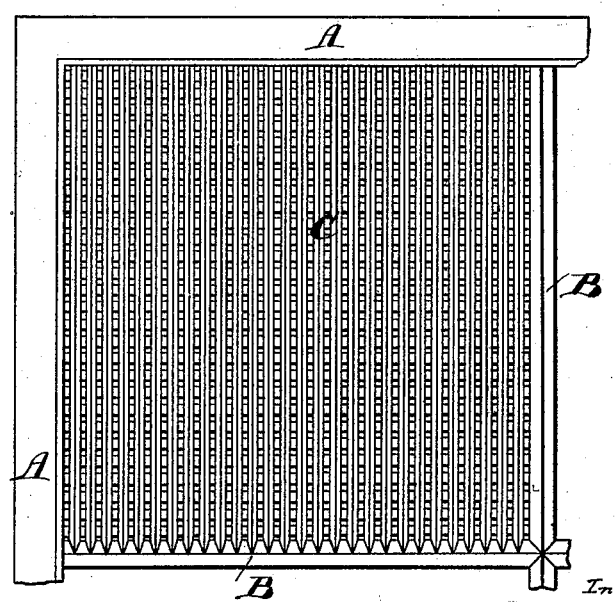

In the accompanying drawings, Figure 1 is an elevation of my improved plate, showing its general appearance. Fig. 2 is a cross-section, to a larger scale; and Fig. 3 is an elevation of one part of the plate, also to a larger scale.

A is the rim of the plate, which, as shown in Fig. 2, is of wedge shape in cross-section, the edge being rounded off. The body of the plate is divided into a number of panels by the cross-bars B of diamond shape in cross-section and of equal depth to the rim. Each panel consists of a large number of wedge-shaped ribs C of half the depth of the plate and on both sides. These ribs cross each other in each panel, so that those at the front may be horizontal, while the corresponding back ones are vertical, or vice versa. As shown most clearly in Fig. 3, between the crossing ribs small spaces or holes are left, which allow the electrolyte to circulate freely through the plate. The ribs in alternate panels are reversed in position, as shown in Figs. 1 and 2, horizontal ribs alternating with vertical ones. The plate is thus rendered as rigid as possible, resisting any tendency to buckling and making it equal in strength in all directions. As the ribs, cross-bars, and rim all provide edges toward the surface of the plate and thicken toward the middle, the effect of a central core is obtained, which acts as a conductor less affected by the electrolyte than the surfaces of the plate where the metal is thinner.

What I claim as my invention, and desire to secure by Letters Patent, is—

1. A plate of the Planté type for secondary batteries, divided into a number of panels by cross-bars of diamond shape in section, each panel consisting of two sets of ribs wedge-shaped in cross-section extending respectively from the opposite sides to half the depth of the plate and crossing each other at right angles, substantially as herein described and shown.

2. A secondary-battery plate of the Planté type, consisting of the rim A, the cross-bars B of diamond shape in section dividing the plate into a number of panels, and the two sets of ribs C wedge-shaped in cross-section extending respectively from the opposite sides to half the depth of the plate crossing each other at right angles and arranged alternately in the panels, substantially as herein described and shown.

In witness whereof I have hereunto set my hand in the presence of two witnesses.

BERTHOLD KUETTNER.

Witnesses:
FRANK WILLIAM PATTISON,
ANNIE CECILIA HÄRLE.